US006526268B1

(12) United States Patent
Marrah et al.

(10) Patent No.: US 6,526,268 B1
(45) Date of Patent: Feb. 25, 2003

(54) MOBILE WEATHER BAND RADIO AND METHOD

(75) Inventors: Jeffrey Joseph Marrah, Kokomo, IN (US); Harry Diamond, Tipton, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/390,794

(22) Filed: Sep. 7, 1999

(51) Int. Cl.[7] .............................................. H04M 17/02
(52) U.S. Cl. .................... 455/186.1; 455/456; 455/34.4
(58) Field of Search ................................ 455/344, 404, 455/179.1, 456, 414, 186.1, 161.3, 161.1, 457; 340/601, 286.02, 905, 7.54; 701/207, 117; 702/3

(56) References Cited

U.S. PATENT DOCUMENTS

| | | | | | |
|---|---|---|---|---|---|
| 4,031,467 | A | | 6/1977 | Singleton, Jr. et al. | 325/54 |
| 5,023,934 | A | * | 6/1991 | Wheeless | 455/45 |
| 5,144,440 | A | * | 9/1992 | Wignot et al. | 358/188 |
| 5,390,237 | A | * | 2/1995 | Hoffman, Jr. et al. | 379/67 |
| 5,420,794 | A | | 5/1995 | James | 364/436 |
| 5,434,565 | A | * | 7/1995 | Simen et al. | 340/949 |
| 5,574,999 | A | * | 11/1996 | Gropper | 455/186.1 |
| 5,685,786 | A | * | 11/1997 | Dudley | 473/407 |
| 5,724,316 | A | | 3/1998 | Brunts | 368/10 |
| 5,771,484 | A | * | 6/1998 | Tognazzini | 701/117 |
| 5,781,852 | A | | 7/1998 | Gropper | 455/227 |
| 5,978,738 | A | * | 11/1999 | Brown | 702/3 |
| 5,991,687 | A | * | 11/1999 | Hale et al. | 701/207 |
| 6,018,699 | A | * | 1/2000 | Baron, Sr. et al. | 702/3 |
| 6,133,853 | A | * | 10/2000 | Obradovich et al. | 340/905 |
| 6,177,873 | B1 | * | 1/2001 | Cragun | 340/601 |
| 6,313,735 | B1 | * | 11/2001 | Higuchi | 340/7.54 |

FOREIGN PATENT DOCUMENTS

GB 0779752 A2 * 6/1997 ............ H04Q/7/22

OTHER PUBLICATIONS

"Garmin Delivers Weather Data to the Cockpit", Dec. 13, 1999, GNS 430, 530, Echo Flight, Garmin.com.*

National Weather Service, NOAA Weather Radio (NWR) Transmitters, NWR Specific Area Message Encoding NWR—Same, Update #4.42, Mar. 31, 1999.

* cited by examiner

*Primary Examiner*—Thanh Cong Le
*Assistant Examiner*—C. Chow
(74) *Attorney, Agent, or Firm*—Jimmy L. Funke; Stefan V. Chmielewski

(57) ABSTRACT

A mobile weather band radio and method with dynamic geographic message updating. The radio has a weather band tuner for receiving weather band signals containing a message and a geographic identification code. A position indicative receiver is provided for receiving position indicative signals and determining a current position of the radio. Geographic identification codes and electronic map data are stored in memory for defining geographic regions corresponding to the geographic identification codes. A controller determines one of the geographic codes corresponding to the determined current position based on the position indicative signals, and further performs an operation, such as playing the message, when the determined geographic code corresponds to the received geographic code.

40 Claims, 6 Drawing Sheets

MOBILE WEATHER BAND RADIO AND METHOD

TECHNICAL FIELD

The present invention generally relates to electronic radios and, more particularly, to a mobile weather band radio for providing weather messages, emergency messages, and other information.

BACKGROUND OF THE INVENTION

The National Oceanic and Atmospheric Administration (NOAA) has been providing a weather band radio broadcast service in the United States for many years. The NOAA weather radio (NWR) service provides continuous weather and emergency related updates to local geographic regions. The NOAA weather radio service provides weather-related warnings and serves as a broadcast warning system for other emergency messages about events that may threaten life and/or property. To receive weather band broadcast service information, a specially designed receiver is generally required to tune to the weather band broadcast. Currently, the NOAA weather band broadcast transmissions include seven narrow band frequency modulated (FM) channels in the very high frequency (VHF) band ranging from 162.400 to 162.550 kHz, with a 25 kHz channel separation between adjacent channels. The seven channels are broadcast from transmitters located in various geographic regions and the signals for multiple channels often overlap. Accordingly, it is possible to tune a weather band radio to receive a plurality of weather band channels from one location.

Recently, NOAA has added digital voice synthesis which allows for faster distribution of emergency updates, in contrast to analog voice recordings. Moreover, NOAA has also added Specific Area Message Encoding (SAME) which provides digital information indicative of the geographic region covered by the accompanying message. Currently, the geographic regions are typically defined by counties. This allows for weather band receivers to filter out messages that do not pertain to a selected geographic region. In general, the NOAA weather radio transmitter devoted to a given geographic area may not provide the strongest signal with the best reception that is available at certain locations in its coverage area. As a consequence, by simply tuning to the station having the strongest signal, a radio user may miss those messages pertaining to the geographic region of interest.

The use of the SAME message generally allows for receipt of only those messages in a selected geographic area. The weather band radio must include decoding circuitry capable of decoding the SAME digital message. In addition, a geographic identification code generally is used to identify the county of interest, and the code must be manually input into the decoding circuitry to configure the radio for the geographic area of interest. Once configured, the weather band radio will respond only to those messages associated with the selected geographic identification code, and may ignore alert messages which do not pertain to the selected region of interest. For home-based weather band radios, the SAME message is satisfactory since the location of the radio is generally fixed. However, when the weather band radio is transported from one geographic coverage region to another geographic coverage region, the weather band radio generally must be reprogrammed by the user. This reprogramming drawback becomes particularly significant when a weather band radio is used in a mobile vehicle, such as an automobile, which frequently travels amongst various geographic counties. Accordingly, it is therefore desirable to provide for a weather band radio which offers dynamic updating to adjust for geographic location.

SUMMARY OF THE INVENTION

In accordance with the teachings of the present invention, a radio and method of providing radio messages with geographic based messaging is provided. The radio includes a receiver for receiving broadcast radio signals containing a message and a corresponding geographic identifier. The radio includes a device for determining a current position of the radio. Also included are geographic identifiers and electronic map data, preferably stored in memory, for defining geographic regions corresponding to the geographic identifiers. A controller determines which one of the geographic identifiers corresponds to the determined current position, and further performs an operation when the determined geographic identifier corresponds to the received geographic identifier.

According to the preferred embodiment, the radio is particularly well suited for use as a weather band radio for providing weather and emergency messages and emergency alert signals. The present invention advantageously allows for receipt of those messages that are intended to cover the location of the radio, while ignoring messages not of interest. According to other embodiments, the radio may further provide messages for an upcoming and/or surrounding geographic regions, and may track the message's expiration time.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

Figure 1:
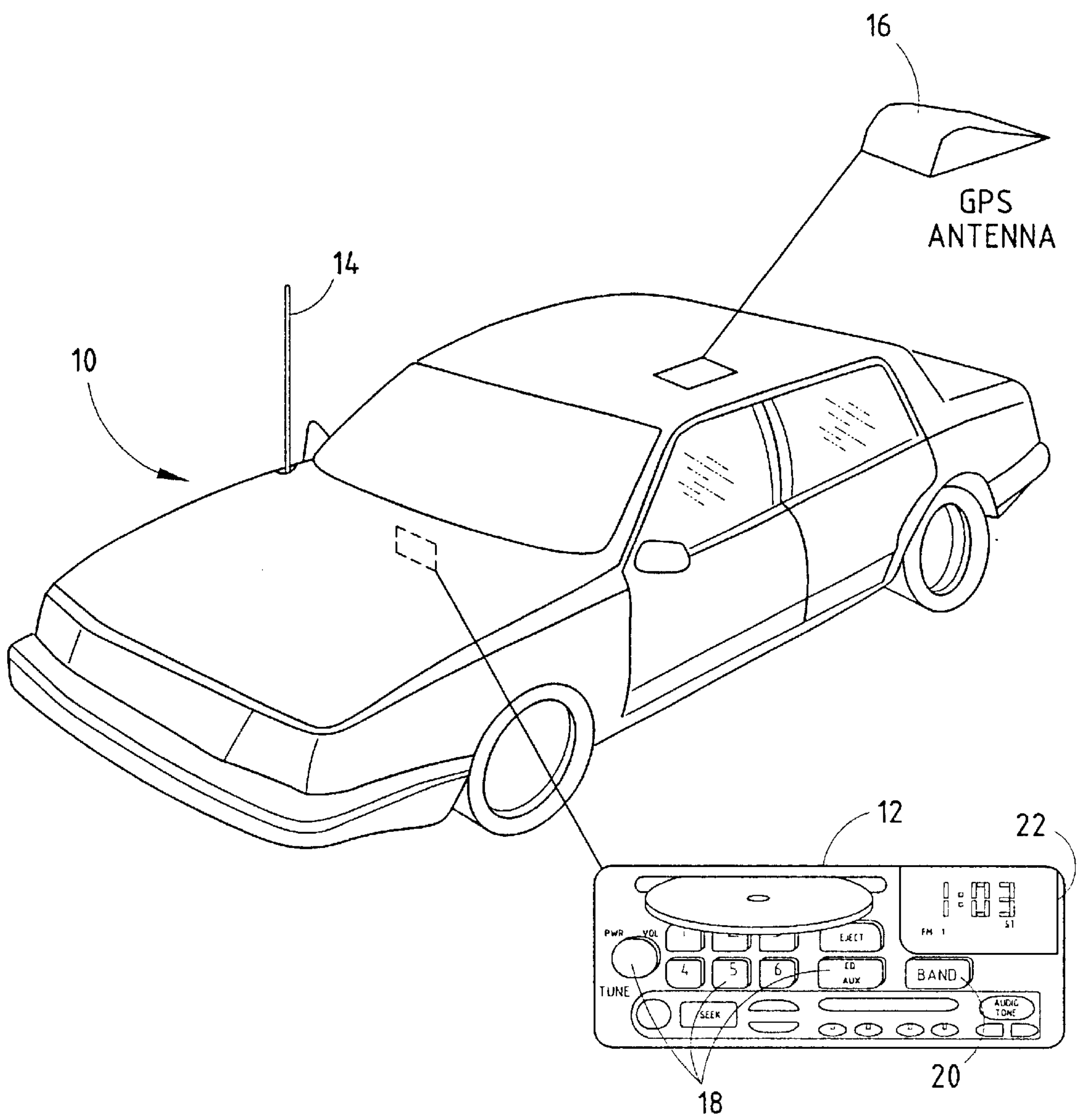
FIG. 1 is a perspective view of an automotive vehicle equipped with a weather band radio.

Referring to FIG. 1, an automotive vehicle 10 is shown equipped with an AM/FM audio car radio 12 which includes a weather band radio integrated with the audio car radio 12.

According to the preferred embodiment, the weather band radio is integrated into the automotive vehicle's AM/FM audio car radio 12 to provide for receipt of weather band signals that are broadcast within a geographic region of interest. While the weather band radio described herein is integrated in an audio car radio 12, it should be appreciated that the weather band radio may be employed as a separate stand alone electronic device, such as a portable hand held device, and may be used in other various applications, without departing from the teachings of the present invention.

The audio car radio 12 may be easily mounted in the dash of the vehicle 10 according to a conventional car radio installation. The car radio 12 shown is an AM/FM radio equipped with an audio tape and a CD player, and includes a human-machine interface (HMI) key matrix with a plurality of manually operable controls 18 which extend from its face plate. Included in the controls 18 is a "BAND" pushbutton switch 20 for selecting amongst the available broadcast bands which include the amplitude modulation (AM) band, the frequency modulation (FM) band, and the weather band. The controls 18 and display 22 are easily accessible by the driver or a passenger in the vehicle 10. In addition, the vehicle 10 further includes an AM/FM/weather band antenna 14 for receiving broadcast signals. Antenna 14 is capable of receiving the weather band frequency range, as well as the AM and/or FM broadcast signals. Further, a global positioning system (GPS) antenna 16 is preferably mounted on the roof of the vehicle 10, and is exposed to GPS radio wave signals.

Figure 2:
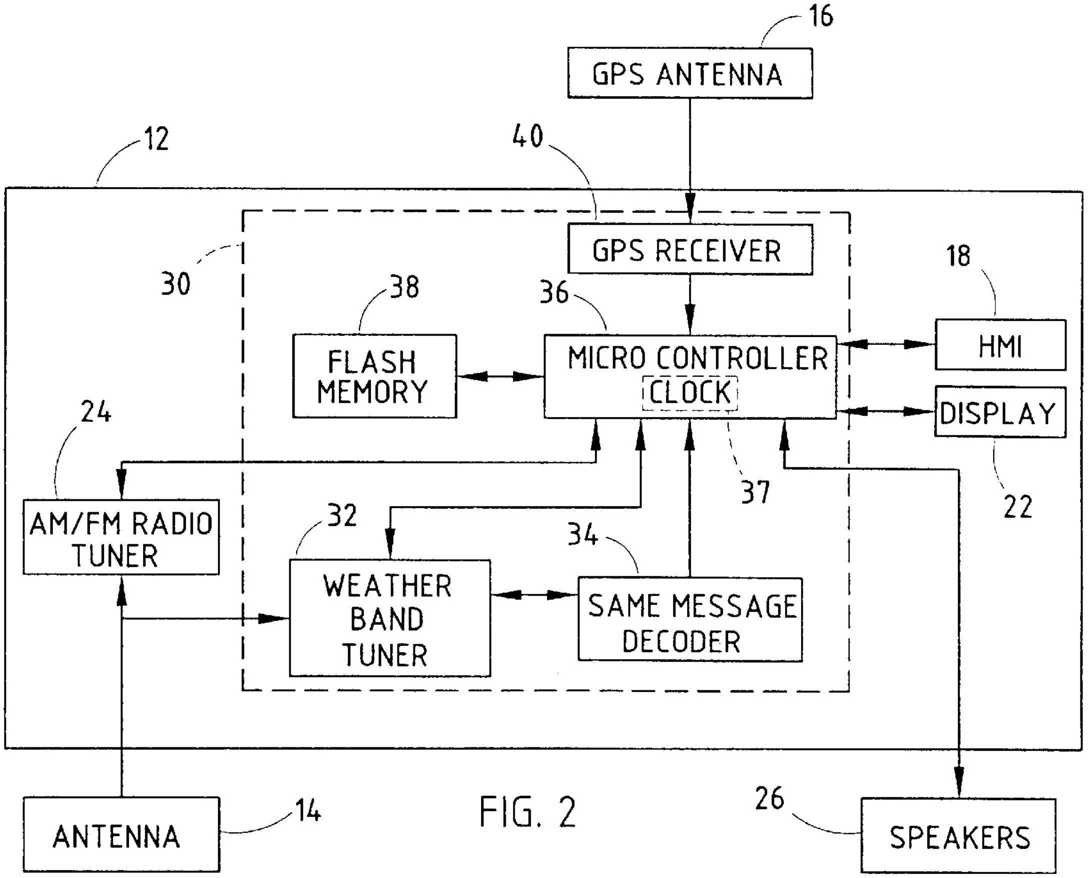
FIG. 2 is a block diagram of the weather band radio integrated into the car radio according to the present invention.

Referring to FIG. 2, the audio car radio 12 is shown connected to antennas 14 and 16, and is further connected to audio speakers 26. Audio car radio 12 contains a conventional AM/FM radio tuner 24 coupled to antenna 14 for tuning to selected radio frequencies. Integrated within the audio radio 12 is a weather band radio 30 which is generally shown by dash lines. The weather band radio 30 is commonly packaged and integrated with the audio car radio 12 such that certain electronics may be shared with the AM/FM radio electronics. The weather band radio 30, according to the present invention, may include a stand alone weather band radio, or may be integrated in the audio car radio 12 as shown.

Included in weather band radio 30 is a weather band tuner 32 which is coupled to antenna 14 for receiving signals received on antenna 14. Coupled to the tuner 32 is a SAME message decoder 34 which receives and decodes the Specific Area Message Encoding (SAME) weather band signals provided by weather band tuner 32. The weather band radio 30 also includes a microcontroller 36, preferably containing a microprocessor, and non-volatile memory, such as flash memory 38. Microcontroller 36 includes a time clock 37. In addition, the weather band radio 30 further includes a global positioning system (GPS) receiver 40 which is coupled to the GPS antenna 16 for receiving current position indicating signals.

The weather band tuner 32 is automatically adjustable via the microcontroller 36 to tune to one of a plurality of available weather band channels for receiving broadcast weather band signals which may contain weather, emergency or other messages. Weather band tuners are commercially available and are well-known in the art for receiving broadcast narrow band FM signals provided throughout the United States by the National Oceanic and Atmospheric Administration (NOAA) weather radio (NWR) service. Currently, the NOAA weather radio service transmits seven weather band channels in the very high frequency range of 162.400 to 162.550 kHz, having a 25 kHz channel spacing between adjacent channels. The weather band tuner 32 is adjustable in that it can be adjusted to tune to any one of the channels that are made available.

The NOAA weather radio service currently transmits weather and emergency related message information on the weather band, and provides an emergency alert system in which weather and emergency messages are broadcast, along with other information, as part of the specific area message encoding (SAME) message. The SAME message further includes one or more geographic identifiers, generally in the form of alphanumeric codes, which define the geographical counties to which the weather or emergency information pertains. Currently, each geographic identification code corresponds to a unique county, however, other geographical boundaries may be defined and assigned a unique code. A description of the current specific area message encoding provided by the NOAA weather radio service is disclosed in the published report entitled "NATIONAL WEATHER SERVICE, NOAA WEATHER RADIO (NWR) TRANSMITTERS, NWR SPECIFIC AREA MESSAGE ENCODING," Update #4.42, dated Mar. 31, 1999, which is hereby incorporated by reference.

The SAME message decoder 34 receives and decodes the SAME message received by the weather band tuner 32, and provides the decoded message to the microcontroller 36. It should be appreciated that the SAME message decoding could, alternatively, be performed by the microcontroller 36. The microcontroller 36 processes the SAME message, along with GPS received position indication information and, in accordance with the programmed software stored in flash memory 38 or other memory, actuates the appropriate response for the geographical region(s) of interest. According to one embodiment, the weather and/or emergency message information is made available for the county where the weather band radio 30 is currently located. According to another embodiment, the predicted upcoming county and/or surrounding counties are included.

According to well-known GPS operations, the GPS receiver 40 receives GPS radio wave signals via the GPS receiving antenna 16. The GPS radio wave signals are emitted from existing GPS satellites. A constellation of multiple high altitude GPS satellites currently exist in earth orbit and are available to provide continuous worldwide position fixes in all types of weather conditions. The GPS receiver 40 has a built-in processing unit and memory for processing the GPS radio wave signals to determine the latitude and longitude position coordinates of the current position, as well as determining the current direction of travel and speed of the vehicle.

More specifically, the GPS receiver 40 continuously receives radio wave signals from the GPS antenna 16 and determines accurate position coordinates which identify the location of the received signals. This determination includes calculating the distance from various satellites to determine a position relative thereto. By measuring the current signals sent by the GPS satellites and knowing orbital parameters of the satellites, the GPS receiver 40 is able to determine the position thereof and generate longitude and latitude position coordinates which identify the position of the received signals. Given the received GPS signals, the latitude and longitude position coordinates of the GPS receiver 40 are determined by computing distance from each of several GPS satellites currently visible to the receiver 40 by direct-line-of-sight. Distance is determined by precise computation of the time required for radio signals to travel from the GPS satellite to the GPS receiver. Combined with precise information about the satellites' positions relative to the earth, precise latitude and longitude position coordinates are computed. GPS is widely known and should be understood to those skilled in the art as a means for providing accurate position information. It should also be understood that enhanced accuracy may be obtained with GPS now and in the future. For example, a differential receiver can also be employed to provide the availability of differential GPS which provides enhanced position determining accuracy. Further, it should be appreciated that other forms of position determining devices, other than GPS, could be employed now and in the future to provide updated position information.

Figure 3:
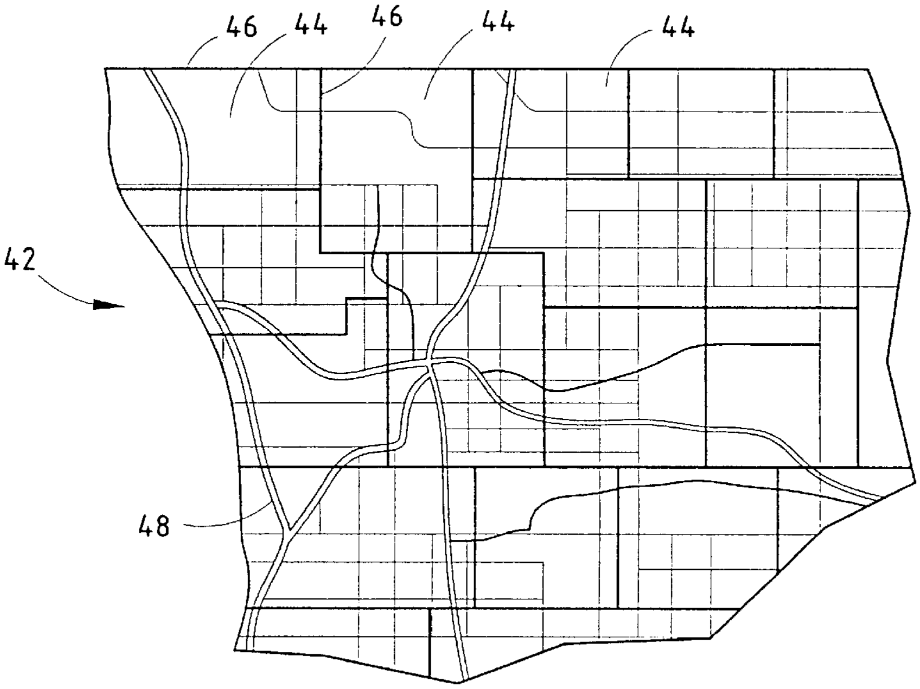
FIG. 3 is a map illustrating one example of geographic county regions which are electronically stored for use in the weather band radio.

Geographic regions are electronically mapped and stored in memory along with geographic identification codes that identify each of the regions. An example of a geographic territory and the boundaries defining each county as the geographic regions is shown in FIG. 3. The solid lines 46 represent the geographic boundaries defining each of a plurality of counties 44. As a mobile vehicle travels on a road 48, the vehicle may cross geographic boundaries 46 to travel from one county to another county. Each of the counties 44 has an assigned geographic identification code stored in memory. The longitude and latitude position coordinates of the boundaries may be stored in memory and compared to the GPS derived current position to determine the geographic region of interest.

According to one embodiment of the present invention, the weather band radio 30 determines which geographic county the vehicle is currently located in, and provides messages which pertain to that geographic county only. According to another embodiment of the present invention, the weather band radio 30 further determines one or more upcoming geographic counties and/or surrounding counties, and provides messages relevant to those counties. It should be appreciated that other geographically defined regions may be employed, such as defining boundaries based on rectilinear coordinates or based on distance from a certain location such as a county seat, without departing from the teachings of the present invention.

Figure 4:
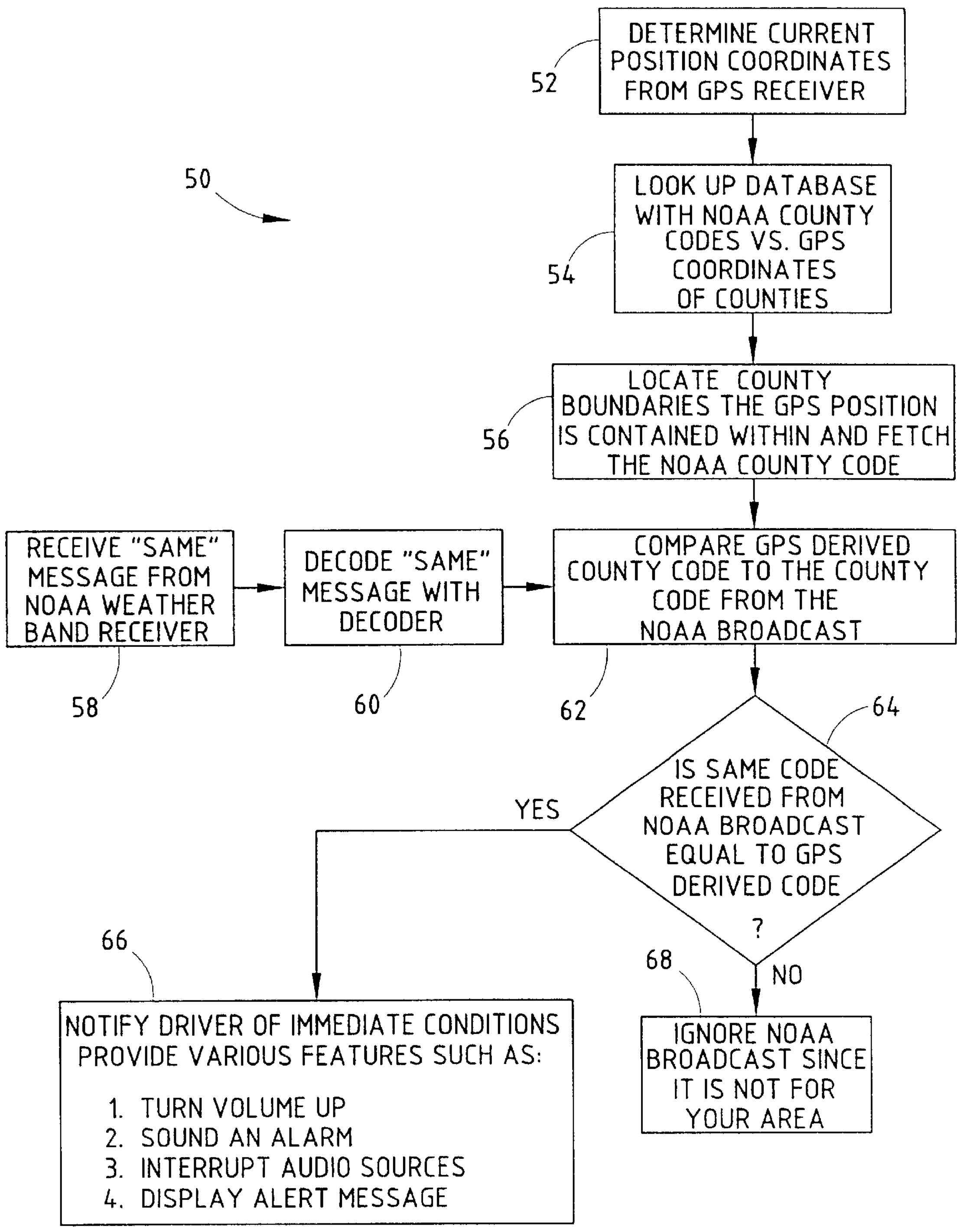
FIG. 4 is a flow diagram illustrating a method of providing geographic based messages with the weather band radio according to one embodiment of the present invention.

Referring to FIG. 4, a methodology 50 for providing weather band radio service in a mobile vehicle is illustrated therein according to one embodiment of the present invention. Methodology 50 determines the current position coordinates from the GPS receiver in step 52. In step 54, methodology 50 performs a lookup in the database which contains the NOAA county codes versus GPS position coordinates of counties. The county boundaries for which the determined GPS position is contained within are located, and the corresponding NOAA county code for that county is fetched from memory in step 56. Accordingly, the NOAA county code, which identifies the geographic region that includes the current position coordinates, is determined.

At the same time, methodology 50 receives the SAME message from the NOAA weather band receiver in step 58, and decodes the SAME message with the decoder in step 60. The radio preferably scans weather band frequencies looking for all broadcast SAME messages. The decoded message may include weather, emergency, or other information. Additionally, the decoded message includes one or more county code identifiers which identify the county, portions of a county, a plurality of counties for which the associated weather, emergency, or other message information pertains. In step 62, methodology 50 compares the GPS derived county code to the county code(s) from the SAME message of the NOAA broadcast. Decision block 64 then compares the SAME county code received from the NOAA broadcast with the GPS derived county code, and determines if the county codes match. If the SAME county code does not match the GPS derived code, the NOAA broadcast message is ignored in step 68, since the message does not pertain to the geographic region in which the radio is located. If the SAME county code matches the GPS derived county code, methodology 50 proceeds to step 66 to notify the driver of the vehicle of immediate conditions or other designated messages. The warning of immediate conditions may include providing various features such as turning the volume up on the audio radio, sounding an alarm, interrupting audio sources such as playback devices and AM/FM broadcasts, displaying an alert message, as well as providing other various features. The alert messages could include the warning of a severe weather condition, such as a tornado watch or a tornado warning, and/or a statement of a condition or emergency regarding non-weather related information. Following each of steps 66 and 68, methodology 50 returns to repeat the steps.

Figure 5:
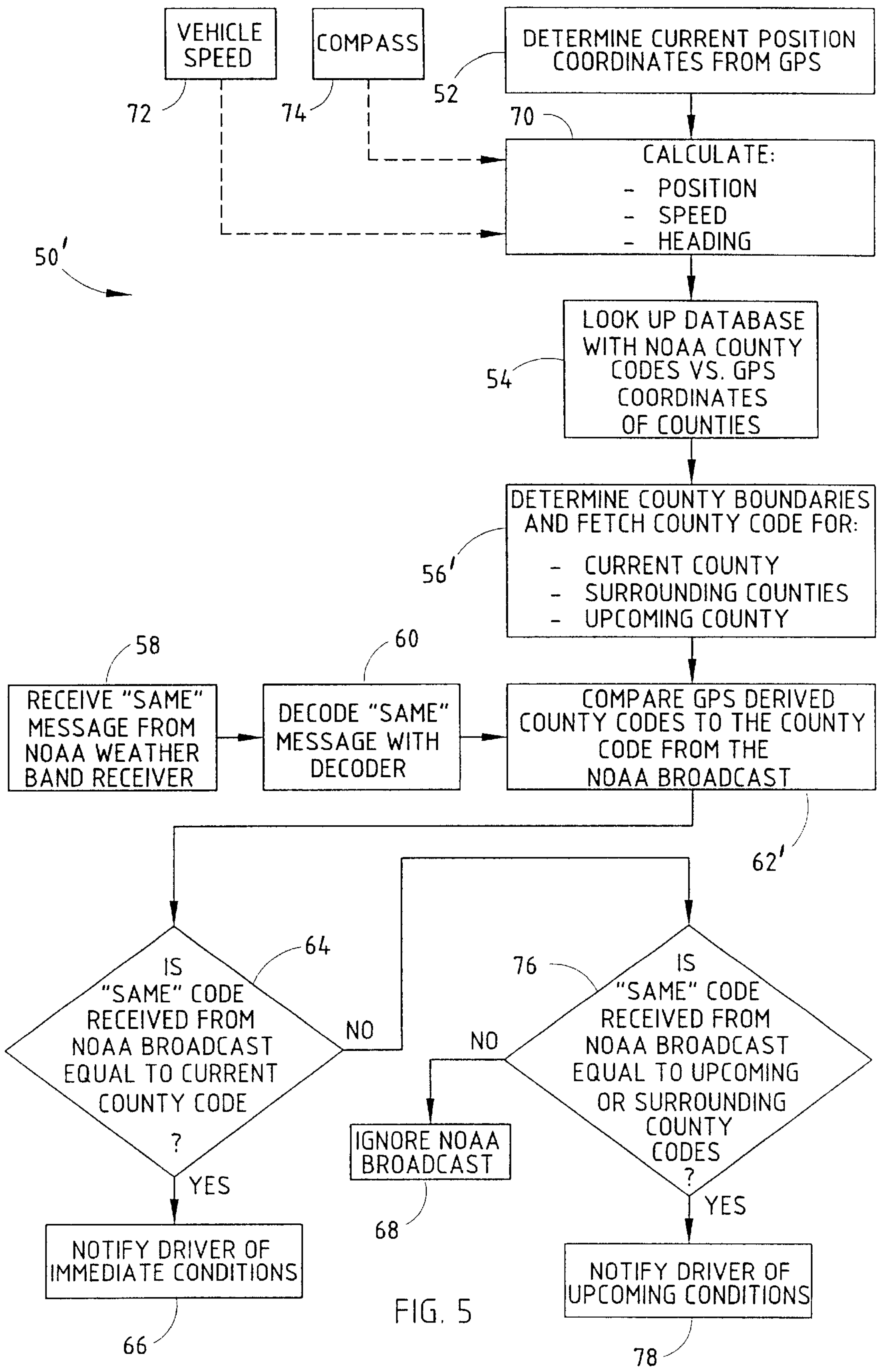
FIG. 5 is a flow diagram illustrating a method of providing geographic based messages with the weather band radio according to another embodiment of the present invention.

With particular reference to FIG. 5, an alternate methodology 50' is shown for providing weather band related information according to another embodiment of the present invention. Methodology 50' includes step 52 of determining the current GPS position coordinates, step 54 of looking up the database with the NOAA county codes versus GPS coordinates of counties, step 58 of receiving the SAME message from the NOAA weather band receiver, and step 60 of decoding the SAME message with a decoder. In addition, methodology 50' calculates the position of the vehicle, the speed of the vehicle, and the heading direction of the vehicle in step 70. The speed and heading information may be computed from the signals received by the GPS receiver or, alternately, may include separate inputs such as a vehicle speed signal 72 and a compass signal 74. In step 56, methodology 50' determines the current county boundaries for the GPS determined position and fetches the county code for the current county, the surrounding counties, and/or the upcoming county. This may include determining the counties of interest as a function of the current detected position, speed, and heading direction of the vehicle. In step 62', methodology 50' compares the GPS derived county codes to the county code received from the NOAA broadcast message.

Methodology 50' proceeds to decision block 64 to determine if the SAME county code received from the NOAA broadcast is equal to the current county code and, if so, notifies the driver of immediate conditions in step 66, as is described above. If the SAME county code is not equal to the current county code, methodology 50' proceeds to decision block 76 to check if the SAME county code received from the NOAA broadcast is equal to the upcoming or surrounding county codes. If the same code is equal to the upcoming or surrounding county codes, the driver of the vehicle is notified of the upcoming conditions for the upcoming or surrounding counties in step 78. Otherwise, methodology 50' ignores the NOAA broadcast, since the message does not pertain to the current county, the surrounding counties of interest, or the upcoming county. Following each of steps 66, 68, and 78, methodology 50' returns to repeat the steps.

Figure 6A:
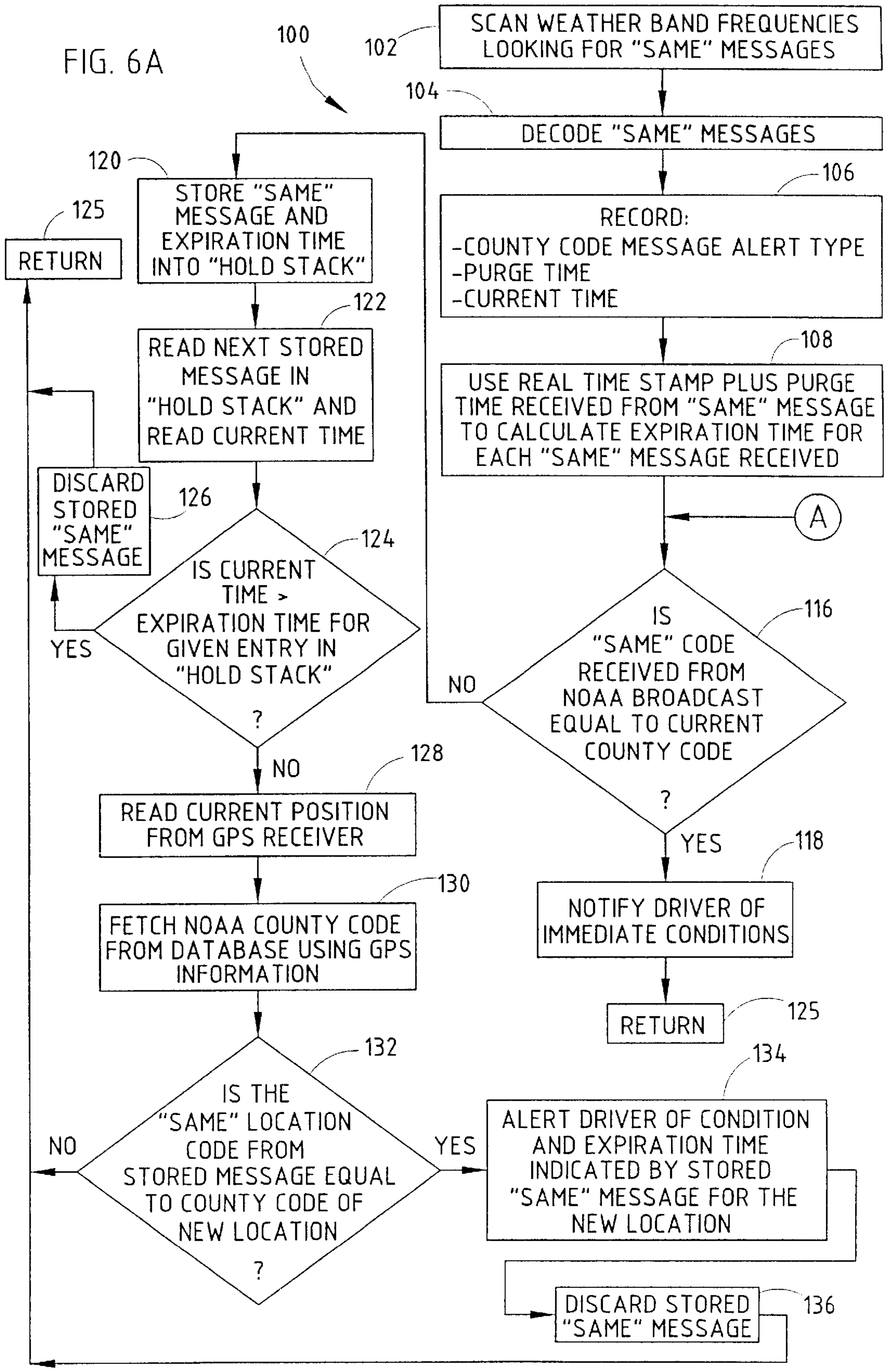
FIGS. 6A–6B is a flow diagram illustrating a method of providing geographic based messages with expiration time tracking according to a further embodiment of the present invention.
Figure 6B:
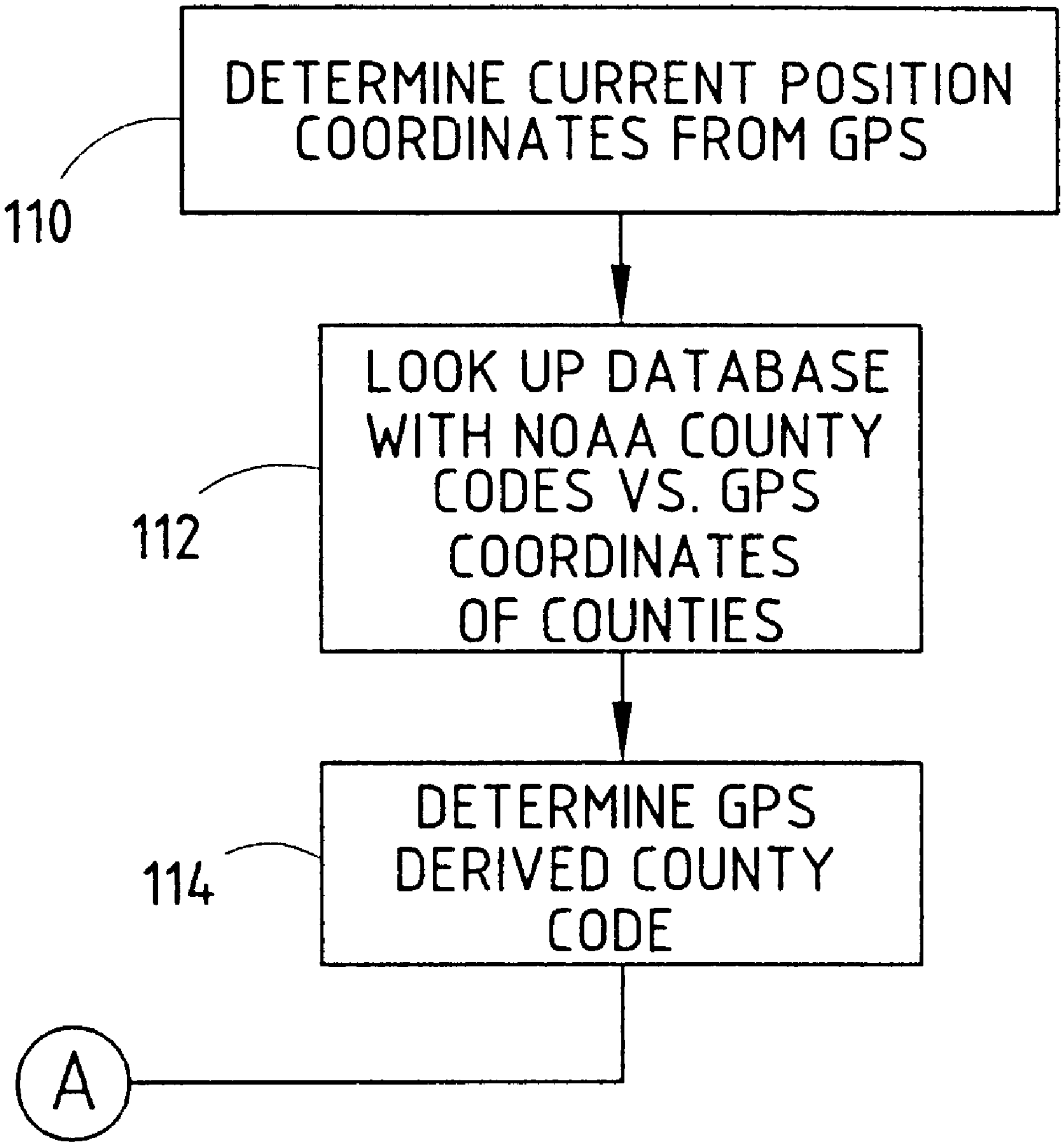

Referring to FIGS. 6A–6B, a methodology 100 is shown for providing weather band related information based on the message's expiration time according to yet another embodiment. Methodology 100 scans the weather band frequencies looking for the SAME messages in step 102 and proceeds to step 104 to decode the SAME messages as is discussed above. In step 106, the county code message alert type, expiration purge time, and current time are recorded. The expiration purge time is determined from the SAME message and provides a period of time over which the message alert is valid. For example, a tornado warning may be accompanied by an expiration purge time period for which the warning is in effect. At the same time, the current time, as taken from the time clock 37, is recorded. In step 108, methodology 100 uses the real time stamp plus the purge time received from the SAME message to calculate an expiration time for each SAME message received. At the same time, methodology 100 determines the current position coordinates from the GPS receiver in step 110, looks up the database with the NOAA county codes versus GPS coordinates of counties in step 112, and determines the GPS derived county code, as is explained above.

In step 116, the SAME county code received from the NOAA broadcast is compared to the current county code. If the SAME county code received from the NOAA broadcast is equal to the current county code, the driver of the vehicle is notified of the immediate conditions provided in the message, as set forth in step 118. Following step 118, methodology 100 returns to the beginning in step 125 to repeat the routine. If the SAME county code received from the NOAA broadcast does not equal the current county code, methodology 100 proceeds to step 120 to store the SAME message and expiration time into a hold stack. The hold stack may include an internally generated shift register for storing each message and its corresponding expiration time in sequentially readable memory locations.

In step 122, the next stored message in the hold stack is read, and the current time is read from the time clock 37. In decision block 124, the current time is compared to the message's expiration time. If the current time is greater than the expiration time for the given message entry in the hold stack, the expiration time has timed out and the alert message is no longer in effect, so methodology 100 proceeds to step 126 to discard the corresponding stored SAME message, and then returns in step 125 to the beginning to repeat the routine. If the current time does not exceed the expiration time for a given message entry in the hold stack, methodology 100 proceeds to step 128 to read the current position from the GPS receiver, and fetches the NOAA county code from the database using the GPS information in step 130. Decision block 132 compares the SAME location code from the stored message with the county code of the new location. If the SAME location code from the stored message does not equal the county code of the new location, methodology 100 proceeds to step 125 to return to the beginning of the routine. If the SAME location code from the stored message is equal to the county code of the new location, the vehicle has entered a county where the message is in effect, and therefore proceeds to step 134 to alert the driver of the alert condition and the expiration time indicated by the stored SAME message for the new location.

Following step 134, methodology 100 proceeds to discard the stored SAME message in step 136 and returns to the beginning of the routine in step 125. Accordingly, methodology 100 may track the expiration time associated with a given alert message and may provide the message when a vehicle enters the geographic region of interest, provided that the expiration time is still in effect for the corresponding message.

Accordingly, the weather band radio 30 of the present invention advantageously provides for weather band messaging to provide those messages that pertain to the geographic region of interest. In particular, the weather band radio 30 advantageously allows for the receipt of weather and emergency messages that pertain to the current geographical position of the weather band radio 30, and may ignore messages that do not pertain to the current geographic position. In addition, the weather band radio may further provide message information pertaining to an upcoming geographic region and/or surrounding geographic regions of interest. Further, the weather band radio may track an expiration time associated with an alert message, and may provide the alert message once the radio enters the geographic region of interest, provided the expiration time has not yet expired.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A radio with dynamic geographic message updating, said radio comprising:

- a radio receiver for receiving broadcast radio signals containing a message and a corresponding geographic identifier;
- a device for determining a current position of the radio;
- geographic identifiers and electronic map data defining geographic regions corresponding to said geographic identifiers; and
- a controller processing the determined current position to determine one of said geographic identifiers corresponding to the determined current position, said controller further performing an operation in response to said message when said received geographic identifier corresponds to said determined geographic identifier.

2. The radio as defined in claim 1, wherein said radio comprises a weather band radio for tuning to weather band stations.

3. The radio as defined in claim 1, wherein said controller ignores said message when said determined geographic identifier does not correspond to said received geographic identifier.

4. The radio as defined in claim 1, wherein said operation comprises communicating said message to a radio listener.

5. The radio as defined in claim 1, wherein said radio is located in a mobile vehicle.

6. The radio as defined in claim 5, wherein said radio is integrated in a car radio.

7. The radio as defined in claim 1, wherein said radio is a portable hand held radio.

8. The radio as defined in claim 1, wherein said device for determining a current position comprises a position indicative receiver for receiving position indicative signals.

9. The radio as defined in claim 8, wherein said position indicative receiver comprises a global positioning system receiver for receiving global positioning system signals.

10. The radio as defined in claim 1, wherein said geographic identifiers comprise unique alphanumeric codes corresponding to each of a plurality of counties.

11. The radio as defined in claim 1, wherein said geographic identifiers and electronic map data are stored in memory.

12. The radio as defined in claim 1, wherein said controller further determines a direction of travel of said radio and determines an expected upcoming geographic region based on said direction of travel, said controller further performing an operation when said expected upcoming geographic region corresponds to said received geographic identifier.

13. The radio as defined in claim 1, wherein said controller further determines one or more surrounding geographic regions and performs an operation when said one or more surrounding geographic regions corresponds to said received geographic identifier.

14. The radio as defined in claim 1, wherein said message comprises an emergency message.

15. The radio as defined in claim 1, wherein said controller further determines an expiration time for said message and compares said expiration time to a current time reading, said controller performing said operation only if said expiration time has not expired.

16. The radio as defined in claim 15, wherein said controller stores said messages and corresponding expiration time and performs said operation when the geographic identifier corresponds to the determined geographic identifier.

17. The radio as defined in claim 1, wherein said receiver includes a tuner.

18. A mobile weather band radio with dynamic geographic message updating, said radio comprising:

a radio receiver for receiving weather band signals containing a message and geographic identifier;

a position indicative receiver for receiving position indicative signals and determining a current position of said radio;

memory storing geographic identifiers and electronic map data defining geographic regions corresponding to said stored geographic identifiers; and a controller processing the determined current position to determine one of said geographic identifiers corresponding to the determined current position, said controller generating an alert signal in response to said message when the determined geographic identifier corresponds to said received geographic identifier.

19. The radio as defined in claim 18, wherein said controller ignores said message when said determined geographic identifier does not correspond to said received geographic identifier.

20. The radio as defined in claim 18, wherein said radio is integrated in a car radio.

21. The radio as defined in claim 18, wherein said radio is a portable hand held radio.

22. The radio as defined in claim 18, wherein said position indicative receiver comprises a global positioning system receiver for receiving global positioning system signals.

23. The radio as defined in claim 18, wherein said controller further determines a direction of travel and determines an expected upcoming geographic region based on said direction of travel, said controller generating said alert signal when said expected upcoming geographic region corresponds to said received geographic identifier.

24. The radio as defined in claim 18, wherein said geographic identifiers comprise unique alphanumeric codes corresponding to each of a plurality of counties.

25. The radio as defined in claim 18, wherein said controller further determines one or more surrounding geographic regions and performs an operation when said one or more surrounding geographic regions corresponds to said received geographic identifier.

26. The radio as defined in claim 18, wherein said controller further determines an expiration time for said message and compares said expiration time to a current time reading, said controller performing said operation only if said expiration time has not expired.

27. The radio as defined in claim 26, wherein said controller stores said messages and corresponding expiration time and performs said operation when the geographic identifier corresponds to the determined geographic identifier.

28. A method for providing radio messages with dynamic geographic updating, said method comprising the steps of:

determining a current position;

comparing said current position with electronically stored map data and determining which one of a plurality of geographic regions said current position is located within;

receiving a radio wave signal containing a message and a geographic identifier;

comparing the determined geographic identifier defined by said position indicative signal with said received geographic identifier and determining whether said determined geographic identifier corresponds to said received geographic identifier; and performing an operation if said determined geographic identifier corresponds to said received geographic identifier.

29. The method as defined in claim 28, wherein said step of performing an operation includes communicating said message to a radio user.

30. The method as defined in claim 29, wherein said step of performing an operation includes producing an audio sound signal in response to said message.

31. The method as defined in claim 28 further comprising the step of ignoring said radio wave signal if said determined geographic identifier does not correspond to said received geographic identifier.

32. The method as defined in claim 28 further comprising the step of storing a plurality of geographic identifiers in memory along with electronic map data with defined geographic regions corresponding to each of said identifiers.

33. The method as defined in claim 28, wherein said radio wave signals comprise weather band radio signals.

34. The method as defined in claim 28, wherein said step of determining a current position comprises receiving position indicative signals with a receiver and determining a current position thereof.

35. The method as defined in claim 28, wherein said radio is located in a mobile vehicle.

36. The method as defined in claim 35 further comprising the step of determining a direction of travel of said vehicle and determining an expected upcoming geographic region based on said direction of travel, and further performing an operation when said expected upcoming geographic region corresponds to said received geographic identifier.

37. The method as defined in claim 28, wherein said radio is a portable hand held radio.

38. The method as defined in claim 28 further comprising the step of determining one or more surrounding geographic regions and performing an operation when said one or more surrounding geographic regions corresponds to said received geographic identifier.

39. The method as defined in claim 28 further comprising the step of determining an expiration time for said message and comparing said expiration time to a current time reading, said method further performing said operation only if said expiration time has not expired.

40. The method as defined in claim 39 further comprising the step of performing said operation when the geographic identifier corresponds to the determined geographic identifier.

* * * * *